United States Patent [19]

Hodges et al.

[11] Patent Number: 4,924,367

[45] Date of Patent: May 8, 1990

[54] SEAM CONSTRUCTION FOR MOLDED SIGNAL LAMPS

[75] Inventors: Joseph T. Hodges, Leawood, Kans.; Russell L. White, Raymore, Mich.

[73] Assignee: Peterson Manufacturing Company, Grandview, Mich.

[21] Appl. No.: 318,701

[22] Filed: Mar. 2, 1989

[51] Int. Cl.[5] .............................................. B60Q 1/26

[52] U.S. Cl. ...................................... 362/311; 362/83; 362/363

[58] Field of Search ............... 362/362, 267, 158, 196, 362/363, 311, 61, 83

[56] References Cited

U.S. PATENT DOCUMENTS

| | | | |
|---|---|---|---|
| 2,113,919 | 4/1938 | Kozematsu | 362/83 |
| 2,174,067 | 9/1939 | Bahr . | |
| 2,668,901 | 2/1954 | Austin, Jr. | 362/267 |
| 2,814,720 | 11/1957 | Martin | 362/267 |
| 2,831,964 | 4/1958 | Diedring | 362/340 |
| 3,046,388 | 7/1962 | Shinn | 362/267 |
| 3,189,738 | 6/1965 | Dover | 362/267 |
| 3,246,136 | 4/1966 | Cheng | 362/311 |
| 3,275,816 | 9/1966 | Brunger . | |
| 3,430,229 | 2/1969 | Ornas, Jr. et al. . | |
| 3,678,266 | 7/1972 | Fradette . | |
| 4,063,591 | 12/1977 | Usher | 165/167 |
| 4,384,316 | 5/1983 | De Vos et al. | 362/267 |
| 4,675,792 | 6/1987 | Dorleans . | |

FOREIGN PATENT DOCUMENTS

| | | | |
|---|---|---|---|
| 624317 | 7/1961 | Canada | 362/267 |

*Primary Examiner*—Ira J. Lazarus
*Assistant Examiner*—Richard R. Cole
*Attorney, Agent, or Firm*—Litman, McMahon & Brown

[57] ABSTRACT

A molded synthetic resin signal lamp is formed by a pair of facing molded bowl shaped housing portions welded or otherwise connected together along a seam. In order to cover the seam to provide a more attractive appearance, the contact line is located beneath a groove and covered by an opaque band or strip. The band has mounting projections to facilitate assembly with one of the housing portions and the other housing portion is assembled therewith in a manner to sandwich the strip in the groove.

6 Claims, 1 Drawing Sheet

Fig. 1.
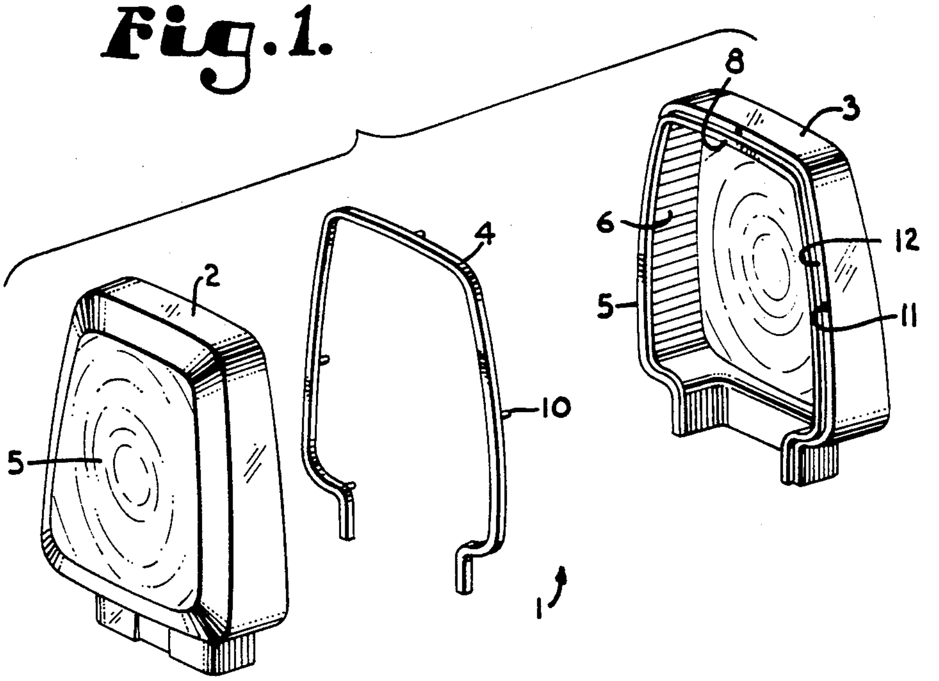
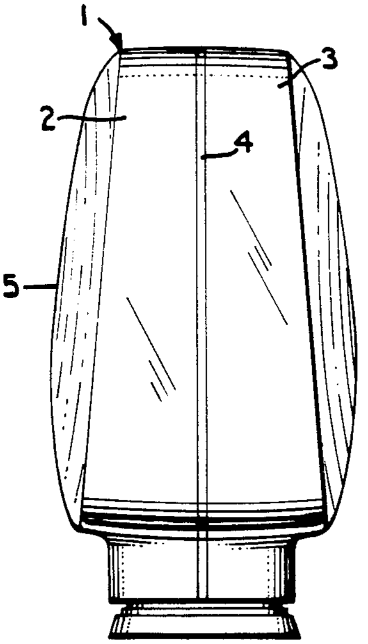
Fig. 2.
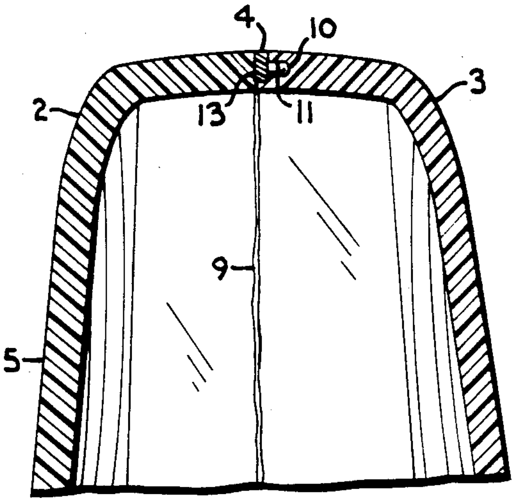
Fig. 3.
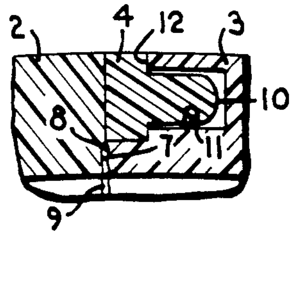
Fig. 4.

SEAM CONSTRUCTION FOR MOLDED SIGNAL LAMPS

BACKGROUND OF THE INVENTION

The present invention relates to a signal lamp primarily intended for automotive use, although suitable for stationary or other use.

It is known to produce molded synthetic resin signal lamp housings by separately producing housing portions which fit together along contacting surfaces. It is also known to "vibration weld" such contacting surfaces or use other means of permanently securing such edges together to form a chamber for enclosing an incandescent bulb or other light source. Such securing methods produce a seam which is relatively unsightly in appearance and interrupts the desired smooth outer surface of the housing assembly.

OBJECTS OF THE INVENTION

The objects of the present invention are: to cover the unsightly seam formed by welding the housing portions together; to cover said seam in a manner which substantially improves the ornamental appearance, and thus, marketability of the finished product; to provide such a seam covering arrangement which is simple and relatively inexpensive to use; to provide an ornamental strip which sandwiches smoothly between the housing portions; to provide such an arrangement wherein the ornamental strip blends into the outer surface of the housing, producing a neat, attractive configuration while covering the welded seam; and to provide such a signal lamp housing assembly which is highly functional, as well as ornamentally attractive, at minimal cost.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an exploded, perspective view showing the parts of a signal lamp housing embodying this invention.

FIG. 2 is a fragmentary, enlarged, cross-sectional view illustrating the relationship between the ornamental band or strip and the front and rear housing portions.

FIG. 3 is a side elevational view showing the completed signal lamp assembly on an appropriate base.

FIG. 4 is a fragmentary, enlarged, cross-sectional view showing details of the joint containing the ornamental band.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skill in the art to variously employ the present invention in virtually any appropriately detailed structure.

The reference numeral 1 generally designates a signal lamp assembly embodying this invention. The signal lamp assembly comprises a front housing portion 2; a rear housing portion 3; and an ornamental band or strip 4.

The housing portions 2 and 3, in this example, are molded from a suitable synthetic resin which is preferably transparent and includes suitable molded-in lens pattern configurations 5 and 6, which function to modify the light distribution from a light source, such as an incandescent bulb (not shown) normally contained within the assembly.

During fabrication of the assembly 1, the housings 2 and 3 are joined along respective abutting edges 7 and 8 (FIG. 4) by appropriate securing means such as vibration welding. This often produces a rough seam 9 which, due to the transparent nature of the housing material, is generally unsightly when viewed from the outside of the assembly. Further, if the seam extended to the exterior surface, it would often form an uneven bulge of material at the juncture which interrupts the smooth external appearance, further adding to a lowering of apparent visual quality.

By the practice of this invention, to avoid the foregoing disadvantages, while simultaneously adding to the ornamental attractiveness of the assembly, the band or strip 4 is utilized.

The band 4 may be fabricated of the same or a similar synthetic resin material as the housing portions but is opaque and desirably of a sharply contrasting color. The band 4 has projections 10 spaced therealong and adapted to be received into spaced bores 11 located in corresponding positions along an outwardly facing edge 12 on the rear housing portion 3.

The edge 12 is displaced rearwardly from the abutting edge 8, producing a groove 13 between the housing portions 2 and 3 when they are joined together along the edges 7 and 8. The band 4 rests snugly in the groove 13 when the housing portions are joined or welded and is trapped therein by the projections 10 resting in the bores 11.

The band 4 is suitably sized so that it virtually completely fills the groove 13, whereupon, during the welding process, said band becomes intimately engaged with the housing portions 2 and 3 and possibly welded thereto, although the primary structural strength of the weld is probably furnished at the seam 9.

The resultant assembly, as shown in FIG. 3, is exteriorly smooth and attractive, with the seam 9 being substantially completely hidden by the band 4. If the band 4 is of sharply contrasting color to the housings 2 and 3, it tends to provide a "racing stripe" appearance, making the product highly visually attractive, which promotes sales potential.

It is to be understood that while certain forms of the present invention have been illustrated and described herein, it is not to be limited to the specific forms or arrangement of parts described and shown, except insofar as such limitations are included in the following claims.

We claim:

1. In a signal lamp:

(a) a lamp housing of synthetic resin having an unsightly welded seam where housing portions are joined in secured relationship, (b) a peripheral open groove extending about said housing over said seam, (c) a strip of material filling said groove and visually blocking said seam, said seam being exposed when viewed from the outside of said lamp except for said strip, and (d) means projecting from one of said strip and a groove side wall into the other of said strip and side wall, thereby locking said strip in said groove.

2. The signal lamp of claim 1 wherein:

(a) said strip is opaque.

3. The signal lamp of claim 1 wherein:

(a) said strip blends smoothly into the exterior surface of said housing.

4. A signal lamp housing comprising:

(a) first and second hollow housing portions of synthetic resin joined in secured relationship along welded abutting edges, therby forming an unsightly seam therealong;

(b) at least one of said housing portions having an edge displaced from the abutting edge, said displaced edge partially defining an open groove extending peripherally about said first and second housing portions, said seam being located at least partially beneath said groove; and (c) a peripheral strip fabricated of synthetic resin and sized to fit in and extend along said groove, (d) said strip visually blocking at least part of said seam, said seam being exposed when viewed from the outside of said lamp housing except for said strip, and (e) means projecting from one of said strip and a groove side wall into the other of said strip and side wall, thereby locking said strip in said groove.

5. The signal lamp housing as set forth in claim 4 wherein said means comprises:

(a) spaced bores extending into said displaced edge, and (b) projections on said strip spaced and directed for receipt into said bores.

6. The housing as set forth in claim 4 wherein:

(a) said strip is opaque and blends smoothly with the exterior surface of said housing.

* * * * *

UNITED STATES PATENT AND TRADEMARK OFFICE

CERTIFICATE OF CORRECTION

PATENT NO. : 4,924,367

DATED : May 8, 1990

INVENTOR(S) : Joseph T. Hodges and Russell L. White

It is certified that error appears in the above-identified patent and that said Letters Patent is hereby corrected as shown below:

On the title page, column 1, line 4, "Russell L. White, Raymore, Mich." should be --Russell L. White, Raymore, Mo.--

On the title page, column 1, line 6, "Grandview, Mich." should be --Grandview, Mo.--

Signed and Sealed this

Eleventh Day of June, 1991

*Attest:*

HARRY F. MANBECK, JR.

*Attesting Officer*

*Commissioner of Patents and Trademarks*